(12) United States Patent
Petrie et al.

(10) Patent No.: US 6,419,162 B1
(45) Date of Patent: Jul. 16, 2002

(54) MAXIMIZING DATA CAPACITY FOR EMBEDDED DATA BLOCKS WITH OCCLUSIONS THEREIN

(75) Inventors: Glen W. Petrie, Los Gatos; Ying Zhang, Santa Clara, both of CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/401,493

(22) Filed: Sep. 22, 1999

(51) Int. Cl.[7] .............. G06K 19/06; G06K 7/10
(52) U.S. Cl. .................... 235/494; 235/454
(58) Field of Search .................. 235/454, 494, 235/487; 382/232, 237, 181; 714/48

(56) References Cited

U.S. PATENT DOCUMENTS

| 5,315,098 A | 5/1994 | Tow .................... 235/494 |
| 5,449,896 A | 9/1995 | Hecht et al. ............ 235/494 |
| 5,453,605 A | 9/1995 | Hecht et al. ............ 235/494 |
| 5,572,010 A | 11/1996 | Petrie |
| 5,576,532 A | 11/1996 | Hecht .................... 235/494 |
| 5,706,099 A | 1/1998 | Curry |
| 5,710,636 A | 1/1998 | Curry .................... 358/298 |
| 5,717,197 A | 2/1998 | Petrie |
| 5,771,245 A | 6/1998 | Zhang .................... 714/762 |
| 5,939,703 A | 8/1999 | Hecht et al. ............ 235/494 |
| 5,951,055 A | * 9/1999 | Mowry, Jr. ............. 283/72 |

* cited by examiner

Primary Examiner—Thien M. Le
Assistant Examiner—Larry D Taylor
(74) Attorney, Agent, or Firm—Oliff & Berridge, PLC

(57) ABSTRACT

A method of developing a configuration for encoding a data glyph block such that the data capacity of the data glyph block is maximized or made optimal. The method of forming an encoded configuration for a data glyph block containing one or more occlusions includes performing one or more of cut off of one or more occlusions, enlargement of one or more occlusions and merger of two or more occlusions, and encoding the cut off, enlarged or merged occlusions with synchronization lines, and encoding any remaining occlusions by error correction, thereby forming the encoded configuration. A method of embedding a data glyph block containing occlusions into an image by halftone rendering of glyph marks, again preferably with the data glyph block having maximal or optimal data capacity, is also set forth.

17 Claims, 7 Drawing Sheets

```
0123456>>>>>>>>>>>>>   *  *  *  >>>234567
1............6......   *  *  *  1........
2............5......   *  *  *  2........
3............4......   *  *  *  3........
*  *  *  *  *  *  *  *  *  *  *  *  *  *  *  *
*  *  *  *  *  *  *  *  *  *  *  *  *  *  *  *
*  *  *  *  *  *  *  *  *  *  *  *  *  *  *  *
8765432<<<<<<<<<<<<<   *  *  *  <<<543210
6............4......   *  *  *  6........
7............3......   *  *  *  7........
8............2......   *  *  *  8........
*  *  *  *  *  *  *  *  *  *  *  *  *  *  *  *
*  *  *  *  *  *  *  *  *  *  *  *  *  *  *  *
*  *  *  *  *  *  *  *  *  *  *  *  *  *  *  *
0123456>>>>>>>>>>>>>   *  *  *  >>>234567
*  *  *  *  *  *  *  *  *  *  *  *  *  *  *  *
*  *  *  *  *  *  *  *  *  *  *  *  *  *  *  *
*  *  *  *  *  *  *  *  *  *  *  *  *  *  *  *
```

Cut Off

Enlarge

Merge

MAXIMIZING DATA CAPACITY FOR EMBEDDED DATA BLOCKS WITH OCCLUSIONS THEREIN

BACKGROUND OF THE INVENTION

1. Field of Invention

The invention relates to a method of developing a configuration for encoding a data glyph block such that the data capacity of the data glyph block is maximized or made optimal. The invention also relates to a method of embedding a data glyph block containing occlusions into an image by halftone rendering of glyph marks, again preferably with the data glyph block having maximal or optimal data capacity.

2. Description of Related Art

It is often desirable to have a document contain not only human readable information, but also machine readable information. For example, a check may desirably contain machine readable identification verification.

An example of such machine readable information is a bar code. However, bar codes are obtrusive and not esthetically pleasing in a document. Therefore, self-clocking glyph codes have been developed in order to embed digitized information within a document in an esthetically pleasing manner. One of the principal advantages of self-clocking glyph codes is that they tend to be esthetically pleasing because of their non-obtrusive visual appearance.

When a data glyph block is written onto a document, it typically forms a uniformly monochromatic (e.g., gray) or polychromatic block upon the document. The glyph marks within the block are not obtrusive to the unaided human eye, thus making the block of embedded data have an esthetically pleasing appearance as opposed to, for example, the more obtrusive bar code.

A data glyph block may contain not only active data areas, i.e., areas where the cells of the data glyph block contain user data, but also may contain one or more occlusions, i.e., areas not containing user data. For example, in order to make the rendered data glyph block inconspicuous upon an artifact, it is often desirable to intentionally include human visible/readable information within the data block, for example to include logos, icons, graphics, text, marks or other objects within the data block. See, for example, co-pending application Ser. No. 09/401,539, filed on even date herewith, entitled "Method Of Encoding Embedded Data Blocks Containing Occlusions"(Petrie), incorporated herein by reference in its entirety. The embedded data block would then appear to be background to the human visible/readable information. However, the human visible/readable information obscures numerous areas of the data glyph block, rendering these areas to occlusions and reducing the data areas and overall data capacity of the data glyph block.

It is also possible to form images themselves utilizing the glyph marks of a data block as the cells making up the image. This is done by the known method of halftone rendering of the glyph marks, for example as described in U.S. Pat. No. 5,315,098 (Tow) and U.S. Pat. No. 5,710,636 (Curry), both incorporated herein by reference in their entireties. In forming such an image, the gray level, or grayscale, values of the glyph marks is varied, for example by making the glyph symbols (for example "/" and "\") thicker/darker or thinner/lighter as needed. The overall image formed contains the machine readable embedded data therein, but again the individual glyph marks are not obtrusive to the unaided human eye.

However, the halftone rendering of the data glyph block results in the formation of occlusions comprised of numerous cells within the data glyph block, for example because the cells must be rendered too dark or too light, for integrity of the image, to be recognized by a decoder.

SUMMARY OF THE INVENTION

It is an object of the present invention to configure and reliably encode a data glyph block containing occlusions such that the data capacity of the data glyph block is optimized.

It is a still further object of the present invention to form an image with a data glyph block. It is also an object of the invention to optimize the data capacity of an image-forming data glyph block without degrading the quality of image formed.

These and other objects are achieved in the present invention by a method of developing a configuration of a data glyph block containing occlusions and having an optimized data capacity, and encoding such configuration.

These and other objects are also achieved in the present invention by a method of forming a halftone image from a data glyph block containing occlusions. Preferably, the configuration of the data glyph block is such that the data capacity of the data glyph block is optimized against the integrity and quality of the image to be formed.

DETAILED DESCRIPTION OF PREFERRED EMBODIMENTS

Figures 1, 2:
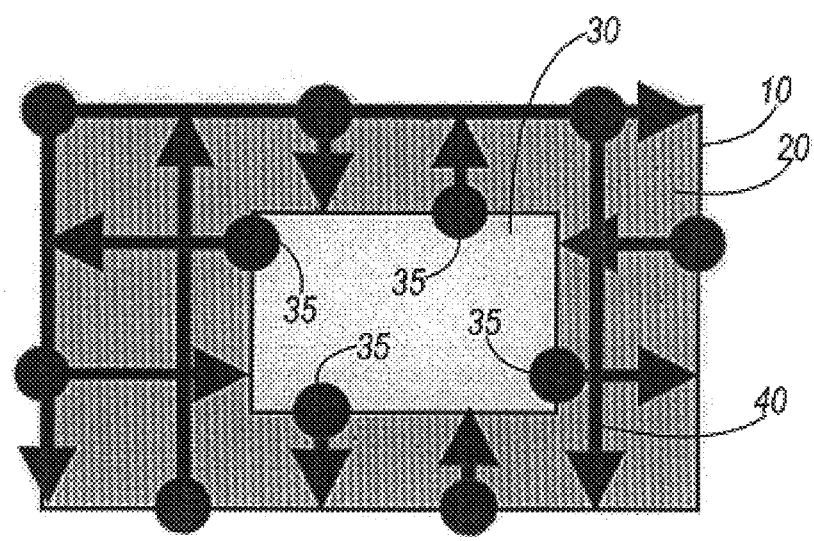
FIG. 1 illustrates counter propagating sequence synchronization lines.
FIG. 2 illustrates an occlusion area within a data glyph block.

A glyph mark is an embedded data character (EDC), which is defined as being a two dimensional image symbology that has at least two graphical states for encoding the logical states ("1" and "0") of a single bit. In practice, each glyph usually is defined by writing a recognizable pattern of "on" and "off" pixels into a two dimensional, array of pixel positions.

A data glyph block or embedded data block (EDB) in turn, is a two dimensional image symbology for the storage and retrieval of data. EDBs are composed of embedded data characters (EDCs), some of which are encoded to define a synchronization frame and others of which are encoded to carry user/application-specific information. The synchronization frame (sometimes referred to as a glyph sync subpattern) and the user information are the two major structural components of an EDB. A glyph pattern is an instance of an EDB.

Thus, a data glyph block, or data block, is a polygonal shaped, typically rectangular shaped, block of data comprised of individual glyph marks in each cell of the block that represent the data in digital form. An occlusion data glyph is a data glyph block with one or more occluded areas within the data glyph block. The employment of occluded areas within a data glyph block might be desirable where, for example, it is desired to include logos, page numbers, borders, backgrounds, highlights within the data glyph block so as to render it more esthetically pleasing upon a document. Unlike random errors that might occur due to, for example, hole punches, etc., occlusions, as they pertain to this invention, are intentionally formed and thus the occluded areas of the data glyph block are known at the time of encoding the data glyph block. Thus, in occlusion data glyphs, data is either not put into occluded areas, or error correction parity is increased to correct the extra errors from the occlusions.

Related patents relating to the encoding of embedded data blocks include U.S. Pat. No. 5,453,605 (Hecht et al.), U.S. Pat. No. 5,449,896 (Hecht et al.), U.S. Pat. No. 5,572,010 (Petrie), U.S. Pat. No. 5,862,271 (Petrie) and U.S. Pat. No. 5,939,703 (Hecht et al.). Related applications related to the encoding of embedded data blocks containing occlusions include co-pending application Ser. No. 09/401,539, filed on even date herewith, entitled "Method Of Encoding Embedded Data Blocks Containing Occlusions"(etrie). All of the foregoing are incorporated herein by reference in their entireties.

A basic self-clocking glyph code typically is composed of a two dimensional array of symbols as the glyph marks that encode bit values of "1" and "0", respectively, or vice-versa, in each of the glyphs. These codes are "self-clocking" because they include an optically detectable symbol (a "glyph") for each of the values they encode. This means that the detection of individual glyphs can be spatially synchronized during the decoding process based on spatial location of surrounding glyphs or symbols. Recording formats for self-clocking glyph codes which spatially reference active data-containing glyphs (i.e., the glyphs that encode user data) to synchronization, or sync, glyphs (i.e., additional glyphs that spatially synchronize the glyph reading process) are known. To this end, the data glyphs and the sync glyphs are rendered onto a recording medium, for example paper, in accordance with a predetermined spatial formatting rule, thereby recording a "glyph pattern". Furthermore, the sync glyphs are spatially distributed within this glyph pattern in accordance with a preselected spatial distribution rule, so the positioning of the sync glyphs is constrained to comply with a predefined geometric subpattern.

To provide a visually homogeneous glyph pattern, the sync glyphs are visually indistinguishable from the active data-containing glyphs. Indeed, all of the glyphs typically are defined by symbols from the same symbol set.

The sync glyphs encode successive bits of a predetermined "sync code sequence", such that the logical ordering of the bits of the sync code sequence is preserved by the spatial ordering of the sync glyphs that encode them. Thus, to identify these sync glyphs, the decode values of glyphs must substantially correlate with the known sync code sequence (in practice, this correlation process may tolerate a small number of correlation errors).

As a general rule, the sync glyph subpattern is composed of one or more linear arrays of sync glyphs. Intersecting linear arrays of sync glyphs are attractive because they can be employed for spatially synchronizing the glyph read/decode process in two dimensions (e.g., along both the x-axis and the y-axis in standard orthogonal coordinates).

Glyphs are ordinarily rendered onto the recording medium in accordance with a preselected spatial formatting rule, so the logical order of the data values that the glyphs encode is preserved by the spatial order in which the glyphs are mapped onto the recording medium. For example, the glyph may be rendered on the recording medium in accordance with a regular and repeating spatial formatting rule that is selected to map the glyph encodings into a two dimensional, rectangular array of logical data blocks of predetermined size, such as data blocks having a X×Y symbol cell format (X and Y being any desired integers).

The sync glyphs may most preferably be comprised of counter propagating synchronization lines, e.g., unique binary sequences, as shown in FIG. 1. Such unique binary sequences can be used to reliably encode the address locations of not only the data glyph block itself, but also the occlusion areas within the data glyph block.

For ease of discussion, the synchronization lines in one direction, for example the x-direction, can be identified as odd numbered synchronization lines that are represented by a unique binary sequence where the individual binary values are laid down from the left most spatial position to the right most spatial position within the glyph block, such that each spatial position of each value of the unique binary sequence can be uniquely determined, and even numbered synchronization lines that are also represented by a unique binary sequence, which may be the same as or different from the odd numbered lines, where the individual binary values are laid down from the right most spatial position to the left most spatial position within the glyph block such that the spatial position of each value of the unique binary sequence can be uniquely determined. Further, by summing the sequence position of an odd numbered and an even numbered synchronization line in both orthogonal direction s (x-axis and y-axis), the block dimension may be determined. For example, as shown in FIG. 1, the numerical values indicate sequence positions of the unique binary sequences used for the synchronization lines. Note that the synchronization lines are counter propagating in both the x and y directions, and that the foregoing discussion, although discussed in one dimension, applies to both directions.

Even though a straightforward self-clocking glyph code is detailed in this disclosure to simplify the description, it will be evident that the broader aspects of this invention are applicable to other symbolic codes.

For an occlusion data glyph to be reliably decoded, the position and size of the data glyph block, meta information (for example, the parity for error correction), and the position and size of each occluded area must be capable of being readily and reliably found. In accordance with the present invention, the inventors have found that for the foregoing information to be reliably encoded and decoded in the data block structure, an occluded area within a data glyph block should satisfy the following conditions:

(1) The occlusion should preferably cross at least two synchronization lines in each direction (i.e., the x-direction and the y-direction). Typically, the minimum size for an occlusion to cross two sync lines is, for example, X×Y glyphs, and smaller sized occlusions thus may need to be enlarged (i.e., additional cells occluded) in order to satisfy this minimum size.

(2) The occlusion should be at least one frame size away from the border or edge of the data glyph block. A frame size can be set to include any number of EDCs. The use of one frame size as the minimum distance allows the search length for the decode process to be one frame size, which can be sufficient to provide a very low probability of a wrong match, depending upon the unique binary sequence employed. If a higher wrong match likelihood can be tolerated, the frame size can be reduced for the same unique binary sequence, allowing the occlusion to be less than one frame size from the border of the data glyph block.

(3) The occlusion should not begin and/or end at any interleaved information within the synchronization line.

(4) The occlusion should be at least one frame size away from other occluded areas with which it overlaps in one of the directions.

Occlusions satisfying the foregoing conditions are referred to herein as resync occlusion areas. A resync occlusion area is shown in FIG. 2, where 10 represents the data glyph block, 20 represents the active glyph area for data, 30 represents the occlusion area, and 40 represents the unique binary sequence synchronization lines.

By satisfying condition 1, it is possible for the method to obtain the size and position information of the occlusion using the property that adjacent counter propagating synchronization lines give such size and position information as explained above.

By satisfying condition 2, it is ensured that no occlusion area blocks synchronization lines so that the border of the data glyph block can be found reliably.

By satisfying condition 3, the ambiguity of the start and end positions of the occlusion is removed.

By satisfying condition 4, the restart synchronization lines can be reliably found. That is, as shown in FIG. 2, the unique binary sequence restarts/resets at the end of the occlusion area in the direction of the sync line (at the points of the four circle 35 portions that touch the border of the occluded area). In order for all occlusions to be reliably located, the restarting of the synchronization lines should preferably not occur less than one frame size apart, or else the probability of a wrong match will increase as discussed above.

An occlusion data glyph can generally be encoded in two ways. First, if the occlusion is a resync occlusion area satisfying the conditions discussed above, it can be directly encoded using synchronization lines (i.e., restarting of the sync lines at the end of the occluded area). Otherwise, the occlusion can be indirectly encoded through the use of any error correction technique (for example, if variable parity can be used, consider the occluded area as an extra error and increase the parity to correct the extra error). Direct encoding results in the size and location of the occlusion being precisely determined during decode so that the occlusion can be ignored during decoding. This technique results in a corresponding reduction in data capacity of the data glyph block as a result of the occlusion. Indirect encoding, on the other hand, results in the data within the occlusion that was destroyed by the occlusion being reliably decoded and reconstructed through the use of error codes. This technique results in a corresponding reduction in data capacity of the data glyph block as a result of the additional space required for storage of error correcting codes.

For using error correction data, error correction data is added to the (user) data to recover from damage to the block. The amount of error correction is dependent upon the expected damage (from the environment) the document will or may be subjected to. The amount of error correction is dependent upon the amount of data, the error pattern and error protection required.

In most error correction schemes, multiple error correction symbols are required to a) locate an error symbol and b) correct an error symbol. Thus, the error correction symbols use available data capacity within the glyph block. Since the size and number of data symbols occluded are known during the encode operation, the amount of error correcting symbols is increased to compensate for the occluded data symbols. The amount the error correction is increased depends on the error correction scheme implemented. This results in a glyph block that originally could encode N data symbols now being able to encode N–E data symbols, where E is number extra error correction symbols to compensate for the occluded symbols.

The foregoing error correction can be applied to any occluded area, provided the added number of error correction symbols do not exceed the data capacity of the glyph block; i.e., N>E, and occlusions do not occlude a minimal number of synchronization symbols for decoding. The minimal number of synchronization symbols will depend on the specific synchronization approach implemented.

For reliable direct occlusion encoding, the occlusion area preferably satisfies all four conditions discussed above, i.e., it is a resync occlusion area. In addition, the occlusion must have a regular polygon shape, most preferably the shape of a rectangle. In this way, counter propagating synchronization lines, e.g., unique binary sequences, can be used to encode the location of the occlusion area within the data block, for example as shown in FIG. 2.

Because occlusions will most likely have various shapes and sizes, it will often be necessary to adjust the shape and size of the occlusion, for example by methods of cut off, enlargement and/or merger with other occlusions, in order to achieve resync occlusion areas satisfying the above-stated conditions.

As discussed above and shown in FIG. 2, the synchronization line sequence restarts (for example, at 0) on the opposite side or edge of the resync occlusion area, i.e., the farthest most edge of the occlusion area from the beginning point of the occlusion area within the sequence. This is regardless of whether the sync line is in the x-direction or y-direction and regardless of whether the sequence in the sync line is increasing or decreasing.

Using extra error correction as discussed above can be very expensive in terms of the additional data capacity required to handle the needed error correction codes. Thus, in addition to using extra error correction with non-resync occlusion areas, it may instead be more desirable to cut off data glyph block to the occlusion, enlarge the occlusion to satisfy the properties of a resync area and then directly encode the enlarged occlusion, and/or merge two or more occlusions to form a single occlusion having the properties of a resync area, and directly encoding the merged occlusion.

In particular, it has advantageously been found in this invention that an encoded configuration of a data glyph block containing occlusions can be developed to have excellent, optimal or near optimal data capacity. The process preferably comprises at least the following steps–first, performing cut off of the data glyph block to occlusions that are too close to a border of the data glyph block, second, forming resync occlusion areas through enlargement with occlusions that do not cross at least two sync lines and/or are next to interleaved information within the sync lines, and/or forming resync occlusion areas through merger of two or more occlusion areas that are too close together, and third, performing error correction with any remaining non-resync occlusion areas. The configuration derived can then be reliably encoded and decoded, the configuration having optimal, or at least near optimal, data capacity.

Each of the foregoing operations is discussed below.

Figure 3:
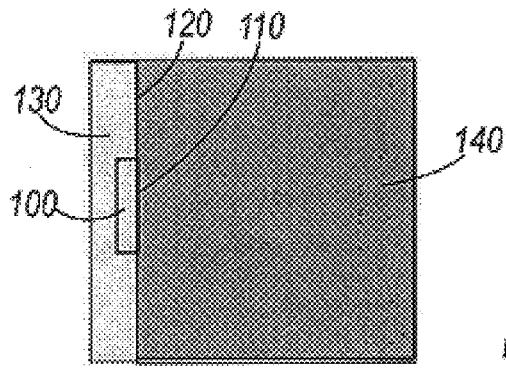
FIG. 3 illustrates the use of cut off of an occlusion.

If the occlusion is too close to the border of the data glyph block, for example if it is within one frame size of the border, so that it does not satisfy condition 2 above to qualify as a resync area, it usually is more desirable to cut off the data glyph block to the occlusion rather than to encode the occlusion with error correction data. To do so, the minimum cut-off edge of the data glyph block to the occlusion to be cut off must be determined. The minimum cut off edge of the data glyph block for the occlusion to be cut off is that edge of the data glyph block at which the occlusion will be cut off with the least amount of loss of overall data capacity in the data glyph block. For example, as shown in FIG. 3, the occlusion 100 is sufficiently close to the border to be cut off. The minimum cut off edge of the data glyph block for the occlusion 100 is edge 110. Cut off will thus be performed along line 120, thereby cutting off the area 130, and reducing the data capacity of the data glyph block to remaining active area 140.

Once cut off is performed, the cut off edge is then treated as the new data glyph block edge for encoding with sync lines.

Figure 6:
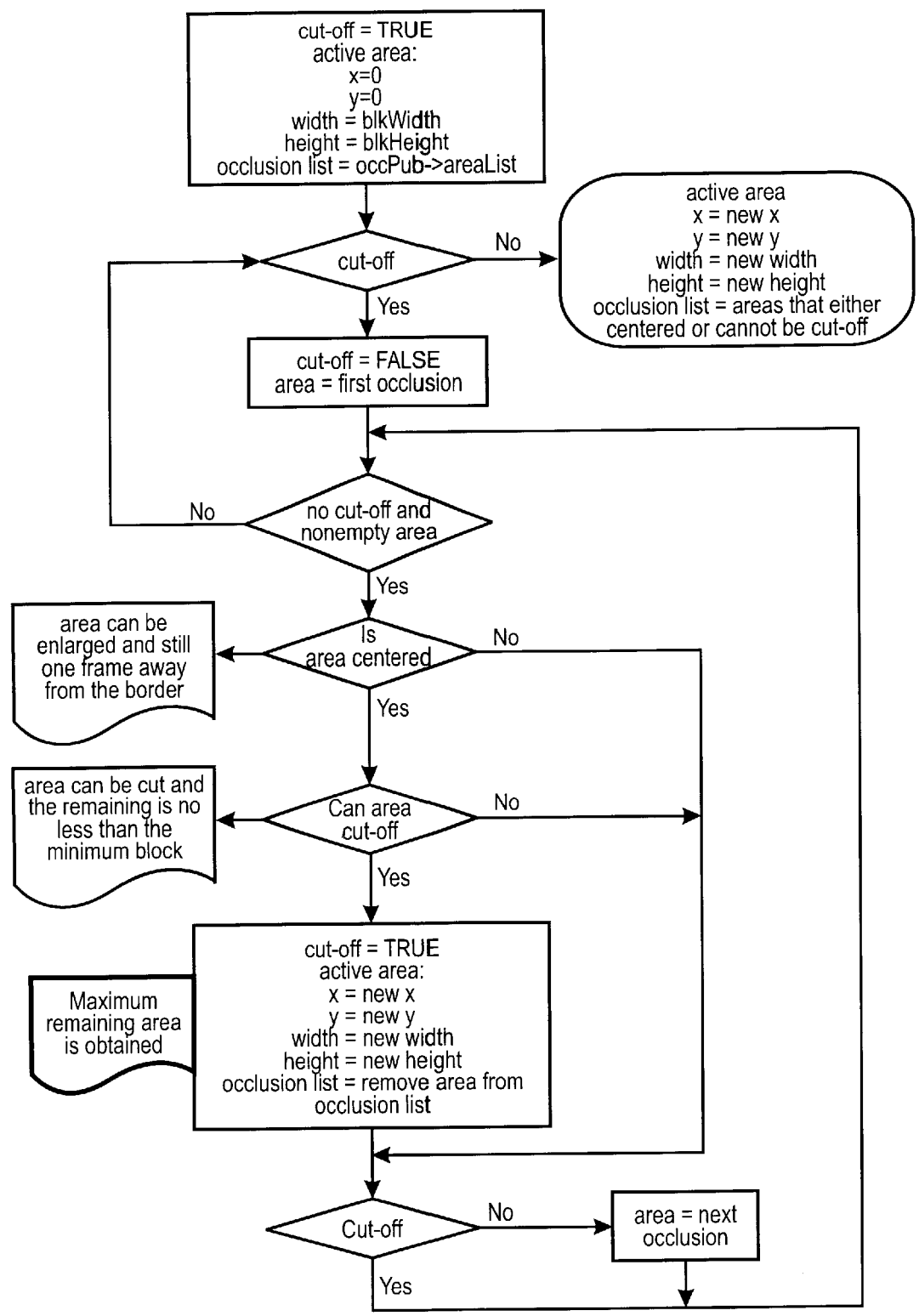
FIG. 6 is a flowchart detailing a first determination step in the method of the invention.

The foregoing determinations are summarized in the flowchart of FIG. 6, detailing the first stage of the present method. The flowchart of FIG. 6 is self-explanatory. The bolded area in the flowchart is one point where optimization is performed.

For each occlusion within a data glyph block, a list is first generated of occlusions that (1) are capable of being enlarged and/or merged to resync occlusion areas and (2) cannot be cut off. For occlusions that can be cut off, the method then finds the minimum cut off edge of the occlusion among the four edge possibilities, and performs cut off at this edge by using synchronization lines to reset the border of the data glyph block to the cut off edge.

Additional flags may optionally be included in the method to enforce a non-cut off condition when the method would perform cut off of an occlusion, but it would be better to perform error correction. For example, if an occlusion having a size of 2×2 EDCs in an occlusion data glyph block of size 45×45 EDCs is located within one frame size of the occlusion data glyph border, the method would seek to perform cut off of the occlusion. However, the cut off would result in loss of more data capacity than error correction of such a small occlusion. Thus, flags can be set to not permit cut off of the occlusion in this situation.

Figure 7:
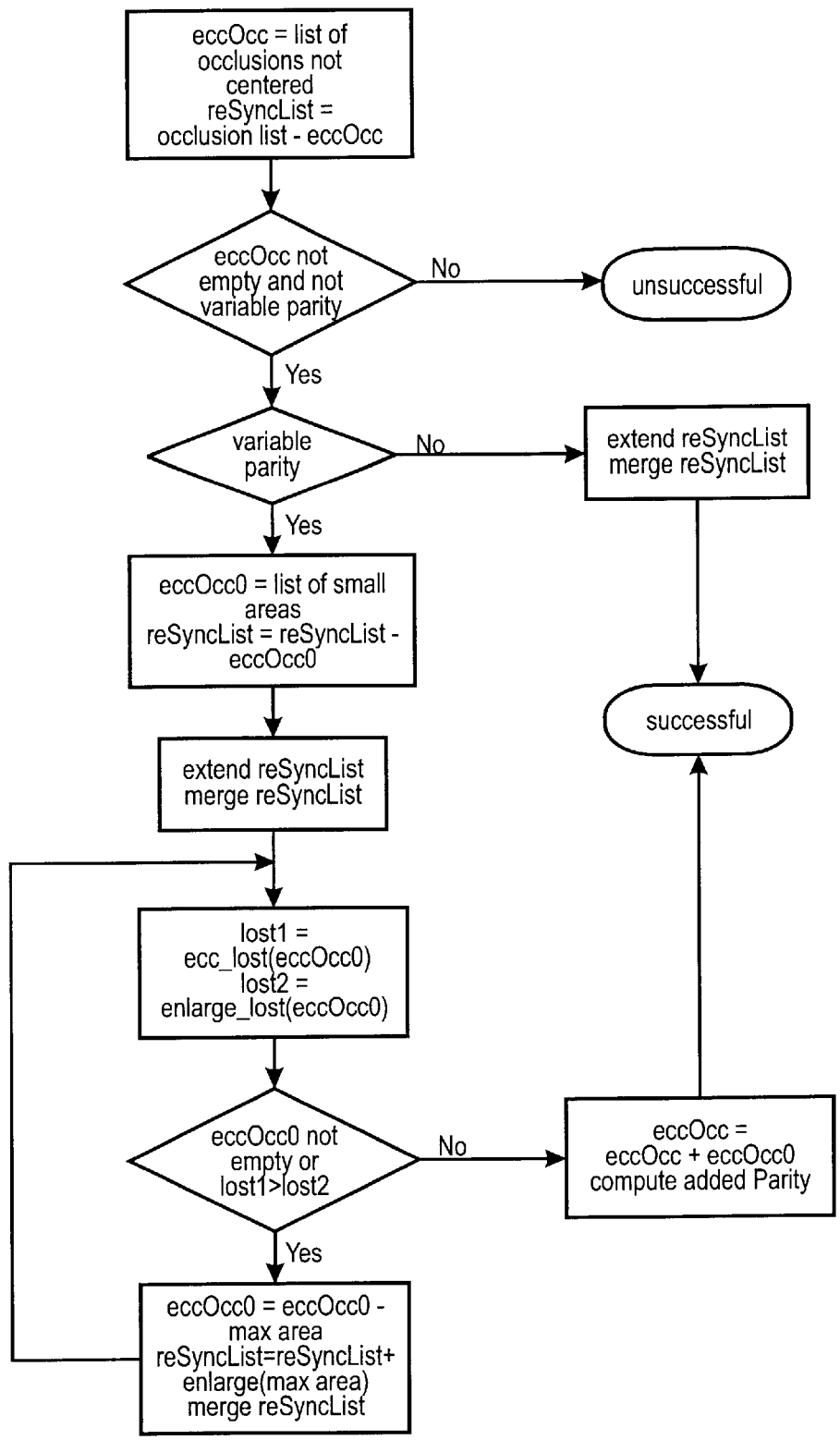
FIG. 7 is a flowchart detailing a second determination step in the method of the invention.

In the next step of the method, detailed in the flowchart of FIG. 7, the remaining occlusions are separated into those occlusions for which error correction will be used and those for which enlargement and/or merger to resync areas will be used. The flowchart of FIG. 7 is self-explanatory. Here again, the bolded area in FIG. 7 is a point where optimization is occurring.

First, those remaining occlusion areas that are closer to the border than one frame size are separated for error correction. Next, the occlusions that do not cross two consecutive sync lines are considered. The loss of bytes that would occur between the use of error correction and the use of enlargement are compared, and the technique affording better data capacity retention is performed. That is, if the occlusion is better enlarged than error corrected, the occlu-sion is removed from the set of occlusions and enlarged so as to cross two sync lines and become a resync area.

Figure 4:
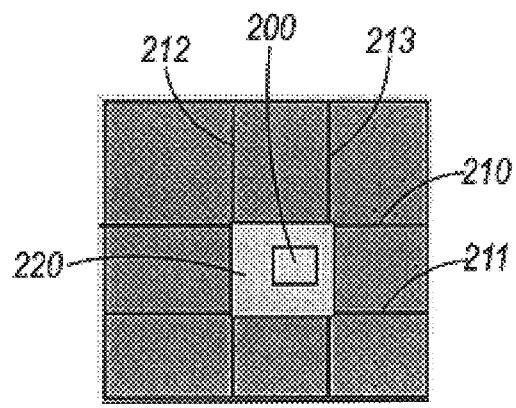
FIG. 4 illustrate the use of enlargement of an occlusion.

Enlargement of an occlusion into a resync area crossing two consecutive sync lines is shown in FIG. 4. Occlusion 200 originally does not cross two consecutive sync lines in both directions 210, 211, 212 and 213. To become a resync occlusion area, additional cells must be occluded so as to enlarge the occlusion to area 220, a resync area crossing two consecutive sync lines.

Figure 5:
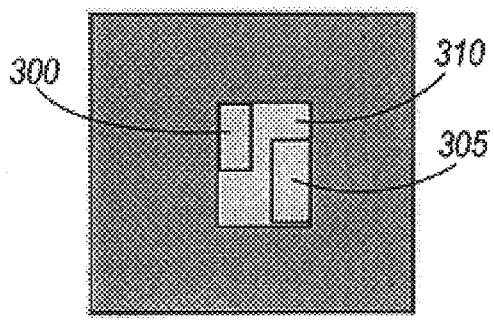
FIG. 5 illustrates the use of merging of multiple occlusions.

Merger of two or more occlusions is illustrated in FIG. 5. Occlusions 300 and 305 are too close together, less than one frame distance, to be reliable decoded. Additional cells are occluded so as to merge the two occlusions into a single occlusion 310 (a resync occlusion area).

Once all occlusions have been addressed by any of cut off, enlargement, merger or error correction as discussed above, the method is complete. The data glyph block configuration obtained has optimal data capacity for the handling of occlusions. The encode configuration comprises an active glyph area after cut-offs, added parities after error correction, and a list of resync occlusion areas after enlargement and merger. Although more than one encode configuration might be associated with a given occlusion data glyph, the present method efficiently achieves an encoded configuration with very good results in terms of data capacity.

The foregoing discussion is focused on the formation of occlusion data glyph blocks that take on a monochromatic or polychromatic appearance when rendered upon an artifact. However, the methodology is equally applicable to the formation of halftone images using the glyph marks to form the image. For general methods of embedding machine readable digital data in halftone images, see, for example, U.S. Pat. No. 5,315,098 (Tow) and U.S. Pat. No. 5,710,636 (Curry), both incorporated herein by reference in their entireties.

Figure 8:
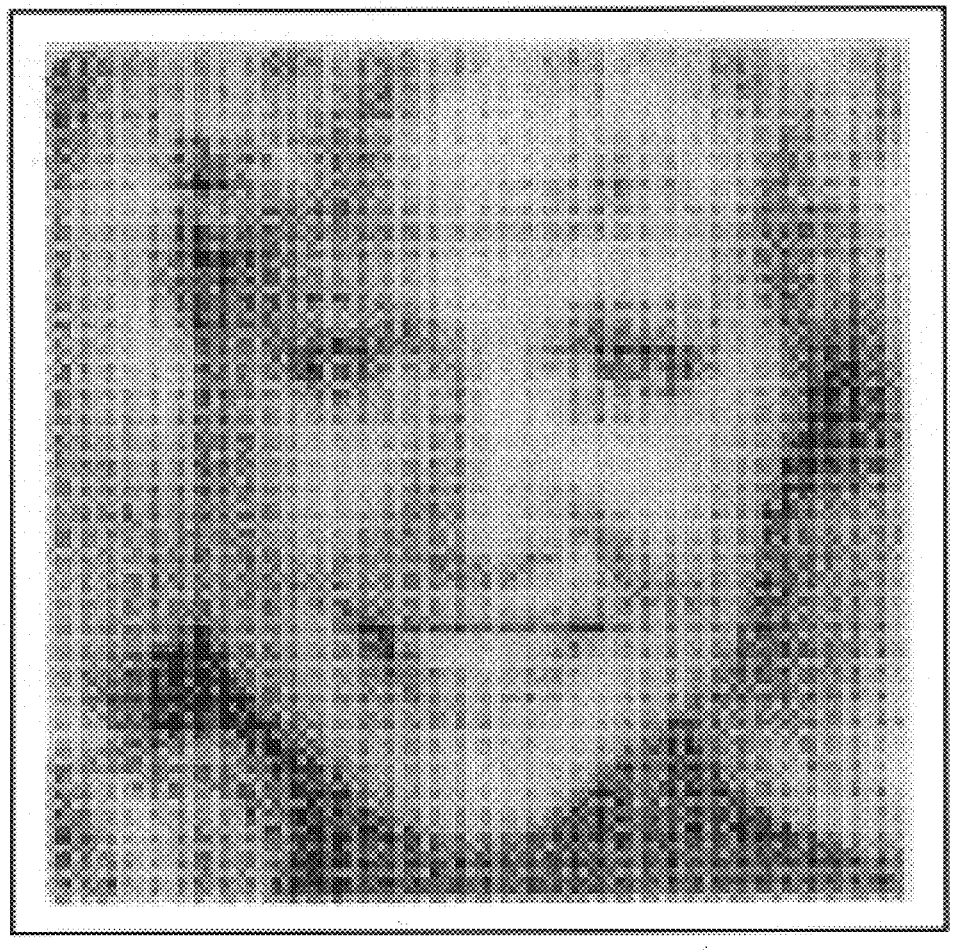
FIG. 8 is an image formed from a data glyph block.

In image formation, each embedded data character (EDC) or glyph symbol in the data glyph code represents a single byte of reliably recoverable digital data. That is, each EDC has two states represented by one of two graphical marks, for example "/"and "\". The data glyph code can be embedded in the image by halftone rendering of the glyph marks, i.e., using the thickness and length of the marks to reflect the gray level of the pixel. Such a rendering is referred to herein as a glyph tone, an example of which is shown in FIG. 8. FIG. 8 is a data glyph code rendered in glyph tone, while FIG. 9 is an enlarged version of the same image where the states of the individual EDCs can be more readily seen as variant size and thickness providing different gray level values (darknesses/lightness).

Figure 9:
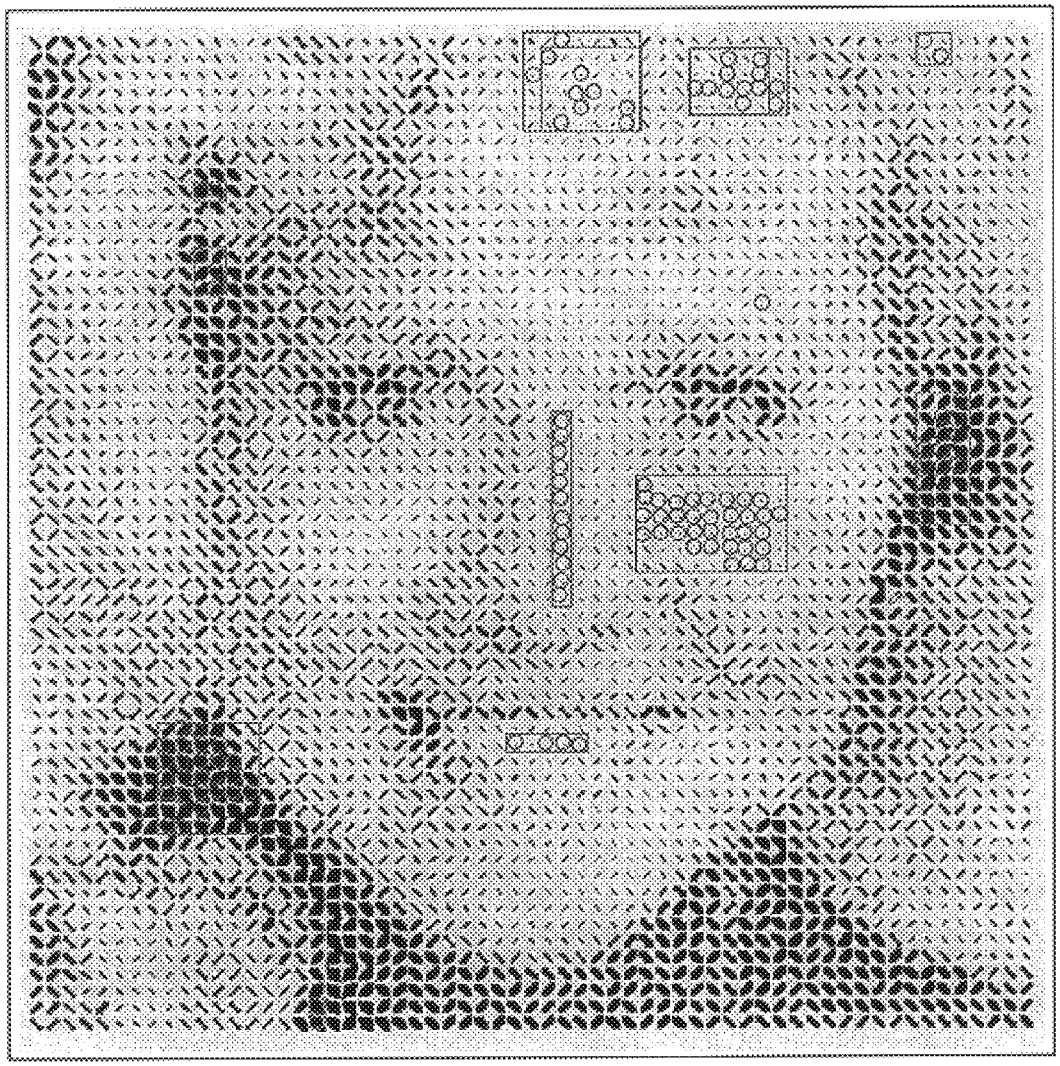
FIG. 9 is an enlarged portion of FIG. 8, with occlusion areas marked.

From FIG. 9, it is evident that glyph symbols may be degraded when the gray levels are either too high or too low, as with circled portions 500 in FIG. 9. The states of these EDCs are such that they cannot be recognized by image processing kernels because the mark is either too thick to be recognized as one of the two alternative states or is too small to be recognized as one of the two alternative states.

Because for any given image to be formed, the gray levels of all of the pixels are fixed, and given any image processing kernel, the low level and high level thresholds of gray level values can be determined, the pixels that are out of the decodeable range can be determined at the time of encoding the data configuration for the image. As such, these pixels can be treated as occlusions within the data glyph block. In FIG. 9, areas of occlusion are represented by square or rectangular blocks around occluded pixels. An encode configuration of the image can be efficiently determined utilizing the methodology discussed above.

In accordance with a second aspect of the present invention, a method of encoding data into a given image is provided, the method comprising digitizing the image into n×m pixels (wherein each of n and m represent integers ≧1), each pixel having a gray level, for example ranging from 0 to N (N being any set integer), determining the low and high level threshold according to an image processing kernel, tagging the pixels that are out of the range of the thresholds, optionally adjusting the gray levels on individual pixels to permit more pixels to be within the thresholds without adversely affecting the image quality, aggregating the tagged pixels into rectangular areas to be occluded, and encoding the data into an occlusion data glyph with size n×m and the set of occluded areas.

The methods for encoding the data glyph blocks have already been discussed above, and include either direct encoding of resync occlusion areas utilizing synchronization lines or indirect encoding using extra error correction.

Once encoded, a halftone image can be written from the encoded configuration by forming each pixel of the image according to its assigned gray level value and glyph shape code (for example, "\" or "/").

Figure 10:
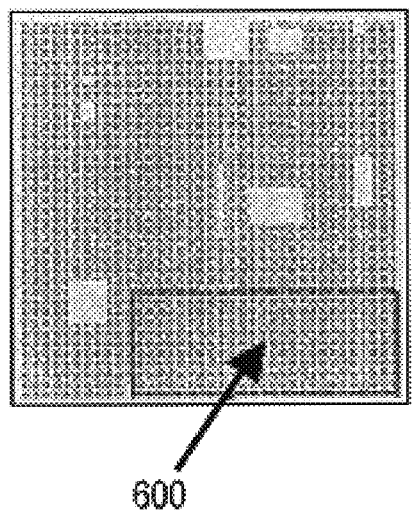
FIG. 10 illustrates the active glyph area of the image of FIG. 8 following performance of cut off.
Figure 11:
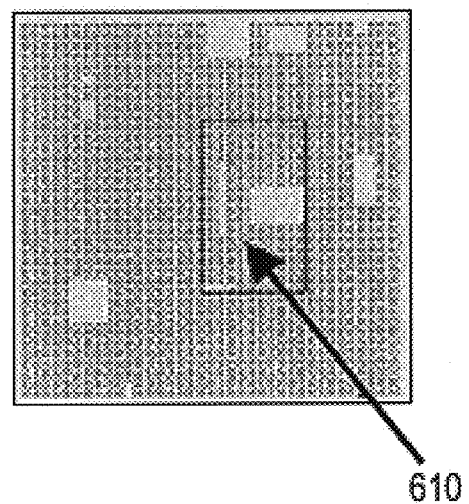
FIG. 11 illustrates a resync occlusion area of the image of FIG. 8 if cut off is not enforced.

The use of the foregoing encoding method for encoding data into an occlusion data glyph rendered in glyph tones can be further illustrated by way of an example. In the encoding method, an occlusion is cut off if it is too close to the border as explained above. Thus, for the image in FIG. 8, although the block size may be, for example, 61×61 EDCs×EDCs with 252 bytes of data capacity and about 30% error correction, the actual or active glyph area might be reduced to only 43×17 EDCs×EDCs with 27 bytes data capacity as a result of the performance of cut off of the occlusions as shown in FIG. 10. However, if we enforce the method not performing cut-off operations as discussed above, the data capacity of the block can be increased to 165 bytes with an occluded area (a resync occlusion area) in the middle of the image as shown in FIG. 11.

However, extra errors (occurring to the data glyph block after rendering) on the border of the data block may cause the image to be not decodeable since such occlusions may block border frame and border sync lines. In order to compensate, it may be desirable to adjust the gray levels of pixels on the sync lines so that none of the pixels on the sync lines are occluded. For the same reason, it may also be preferable not to aggregate occluded areas containing pixels and sync lines.

The encoding methodology is thus equally applicable to halftone images formed data glyph blocks containing occlusions.

What is claimed is:

1. A method of forming an encoded configuration for a data glyph block containing one or more occlusions, comprising
    performing cut off of an occlusion when the occlusion is within one frame size of a border of the data glyph block and when fewer bytes are lost through cut off than through error correction of the occlusion,
    subsequent to performing cut off, performing one or both of enlargement of an occlusion to cross two consecutive synchronization lines in both x and y directions when the occlusion does not cross two consecutive synchronization lines in both x and y directions and when fewer bytes are lost through enlargement than through error correction of the occlusion, and merger of two or more occlusions when the two or more occlusions are located within one frame distance from one another and when fewer bytes are lost through merger than through error correction of the occlusions,
    encoding the cut off, enlarged or merged occlusions with synchronization lines, and
    encoding any remaining occlusions by error correction,
    thereby forming the encoded configuration.

2. The method according to claim 1, wherein the method further comprises rendering the data glyph block onto a recording medium.

3. The method according to claim 2, wherein the rendering is halftone imaging.

4. A method of forming an encoded configuration for a data glyph block containing one or more occlusions, comprising
    determining a first set of occlusions to be cut off and a second set of occlusions not to be cut off,
    for the first set of occlusions to be cut off, if any, determining the minimum cut-off edge of the occlusions to be cut off, and cutting off the occlusions to be cut off at the minimum cut-off edge by encoding the cut-off edge as the edge of the data glyph block with synchronization lines,
    for the second set of occlusions not to be cut off, if any, determining a third set of occlusions to be encoded with error correction and a fourth set of occlusions to be enlarged, merged or both,
    for the third set of occlusions, if any, encoding the occlusions with error correction,
    for the fourth set of occlusions, if any, enlarging, merging or both the occlusions, and subsequently encoding the enlarged, merged or both occlusions with synchronization lines,
    thereby forming the encoded configuration of the data glyph block.

5. The method according to claim 4, wherein the occlusions to be cut off are occlusions located within one frame size of a border of the data glyph block.

6. The method according to claim 4, wherein the method further comprises a flagging step in the determining of the first set of occlusions to be cut off such that if an occlusion to be cut off has a size below a specified minimum, the occlusion is excluded from the cutting off and placed in the second set of occlusions.

7. The method according to claim 4, wherein the third set of occlusions contains occlusions that are closer to the border than one frame size.

8. The method according to claim 4, wherein if an occlusion in the second set of occlusions does not cross two synchronization lines, the method further comprises comparing a loss of bytes from error correction to a loss of bytes from enlargement of the occlusion, and placing the occlusion in the third set of occlusions if the loss of bytes with error correction is less or in the fourth set of occlusions if the loss of bytes with enlargement is the same or less.

9. The method according to claim 4, wherein the occlusions of the fourth set of occlusions are enlarged if the occlusion does not cross at least two synchronization lines in each direction or the occlusion begins or ends next to interleaved information within the synchronization lines.

10. The method according to claim 4, wherein two or more of the occlusions of the fourth set of occlusions are merged if the two or more occlusions are located within one frame size of each other.

11. The method according to claim 4, wherein the synchronization lines are counter propagating unique binary sequences.

12. The method according to claim 4, wherein the error correction is effected with Reed-Solomon codes.

13. A method of forming a halftone image with encoded digital data, comprising digitizing an image into pixels, each pixel having a gray level value and a glyph shape code, tagging each pixel having a gray level value less than a predetermined low threshold gray level value or greater than a predetermined high gray level threshold value, optionally adjusting the gray level value of one or more of the tagged pixels to within the range of the predetermined low threshold gray level value and the predetermined high gray level threshold value, inclusive, and removing the tag from the pixel, aggregating the tagged pixels into one or more areas to be occluded, encoding a configuration including an active glyph area and the one or more image areas to be occluded, thereby forming an encoded configuration, and writing the halftone image from the encoded configuration by rendering each pixel according to its gray level value and glyph shape code.

14. The method according to claim 13, wherein the encoding of the configuration comprises performing one or more of cut off of one or more occlusions, enlargement of one or more occlusions and merger of two or more occlusions, and encoding the cut off, enlarged or merged occlusions with synchronization lines, and encoding any remaining occlusions by error correction, thereby forming the encoded configuration.

15. The method according to claim 13, wherein the encoding of the configuration comprises determining a first set of occlusions to be cut off and a second set of occlusions not to be cut off, for the first set of occlusions to be cut off, if any, determining the minimum cut-off edge of the occlusions to be cut off, and cutting off the occlusions to be cut off at the minimum cut-off edge by encoding the cut-off edge as the edge of the data glyph block with synchronization lines, for the second set of occlusions not to be cut off, if any, determining a third set of occlusions to be encoded with error correction and a fourth set of occlusions to be enlarged, merged or both, for the third set of occlusions, if any, encoding the occlusions with error correction, for the fourth set of occlusions, if any, enlarging, merging or both the occlusions, and subsequently encoding the enlarged, merged or both occlusions with synchronization lines, thereby forming the encoded configuration of the data glyph block.

16. The method according to claim 13, wherein the glyph shape code is selected from the group consisting of / and \.

17. The method according to claim 16, wherein the size and thickness of the glyph shape code determines the gray level value of the glyph shape code.

* * * * *